United States Patent [19]

Thornwall

[11] Patent Number: 4,675,477

[45] Date of Patent: Jun. 23, 1987

[54] ELECTRONIC DEVICE PROVIDING AUTOMATIC PERMUTATIONS OF A VIGENÈRE SQUARE

[75] Inventor: Joseph C. Thornwall, Lanham, Md.

[73] Assignee: The United States of America as represented by the Secretary of the Army, Washington, D.C.

[21] Appl. No.: 367,257

[22] Filed: May 13, 1964

[51] Int. Cl.⁴ .................................................. H04L 9/04
[52] U.S. Cl. ........................................ 380/21; 380/44; 380/50
[58] Field of Search ............. 178/22, 79, 22.01, 22.14, 178/22.19; 340/174, 172.5, 348

[56] References Cited

U.S. PATENT DOCUMENTS

| 2,691,153 | 10/1954 | Rajchman et al. | 307/415 |
| 2,789,159 | 4/1957 | Dreyse | 380/26 |
| 2,810,785 | 10/1957 | Lee | 178/79 |
| 2,917,578 | 10/1959 | Curtis et al. | 178/17 R |
| 3,061,192 | 10/1962 | Terzian | 364/200 |

Primary Examiner—Salvatore Cangialosi
Attorney, Agent, or Firm—Joseph A. Hill; Lawrence A. Neureither; Anthony T. Lane

[57] ABSTRACT

This invention relates to cryptographic teletypewriter systems and more particularly to an electronic device for use in such systems which automatically provides permutations of a Vigenère Square.

4 Claims, 7 Drawing Figures

ELECTRONIC DEVICE PROVIDING AUTOMATIC PERMUTATIONS OF A VIGENèRE SQUARE

The invention described herein may be manufactured and used by or for the Government for governmental purposes without the payment to me of any royalty thereon.

This invention relates to cryptographic teletypewriter systems and more particularly to an electronic device for use in such systems which automatically provides permutations of a Vigenère Square.

One object of the invention is to provide a device which automatically combines two literal characters to derive a third literal character in accordance with a Vigenère Square.

Another object of the invention is to provide an automatic Vigenère Square enciphering-deciphering device which accepts unprocessed message or cipher tapes.

An additional object of the invention is to provide a teletypewriter Vigenère Square enciphering device which automatically transmits a "space" function signal after each group of a predetermined number of message characters and automatically transmits "line feed" and "carriage return" signals after each occurrence of a predetermined number of such message character groups.

Figure 1:
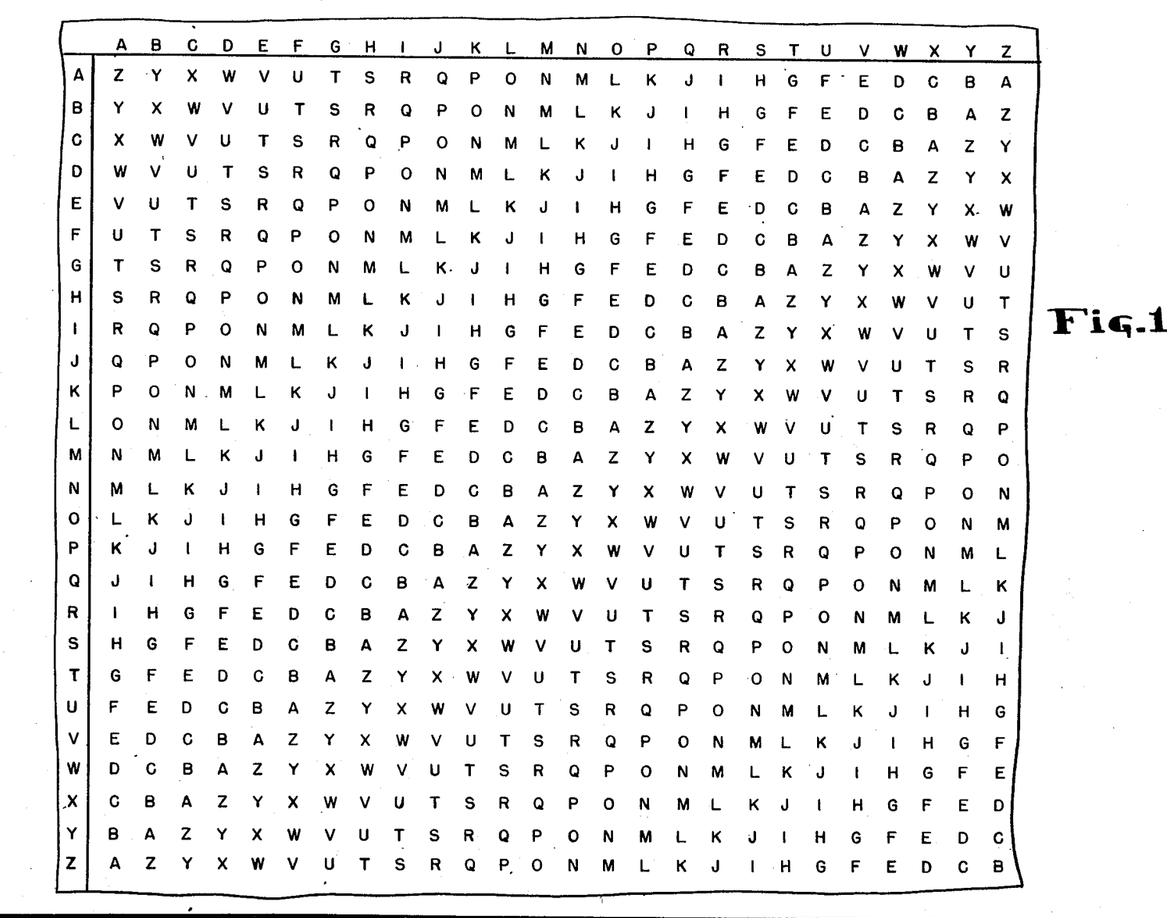
FIG. 1, as previously mentioned, shows a Vigenère Square.

A Vigenère Square is a well known type of polyalphabetic enciphering-deciphering matrix, one form of which is shown in FIG. 1. The FIG. 1 matrix is representative of the operation of the disclosed embodiment of the invention. For enciphering purposes, the horizontal alphabet row outside and across the top of the matrix represents message characters, and the vertical alphabet column outside and down the left side of the matrix represents cipher characters. The reverse-alphabet columns contained within the matrix represent key characters. Thus, message characters ARMY enciphered against key characters NAVY would yield cipher characters MISD from the matrix. The recipient deciphers MISD by application of the key characters NAVY to obtain the message characters ARMY from the matrix.

In accordance with the present invention, a punched message tape to be enciphered or deciphered is submitted to a message character input having sensing means adapted to recognize only literal message characters serially presented thereto. A continuous stream key tape is submitted to a key character input having sensing means adapted to recognize both literal characters and nonliteral teletypewriter function characters serially presented thereto. A message character input array store comprising, generally, twenty-six magnetic cores, each indicative by position of a particular literal character, is provided. This input array store is responsive to message characters recognized by the message character sensing means to establish successive magnetic conditions in the core array representative of the message characters. A key character input array store comprising generally thirty-two magnetic cores, each indicative by position of a particular literal character or one of six usual nonliteral teletypewriter functions character, is similarly provided. This input array store is responsive to key characters recognized by the key character sensing means to establish successive magnetic conditions in the core array representative of the key characters. The six nonliteral character cores in this array are paralleled with the core for a particular literal character, such as the letter Q, so that this literal character will be effectively substituted for each nonliteral function character. The literal character cores in this array are in inverse order with respect to the literal character cores in the message character input array. A scanned store is provided which is coupled to both the message character input array store and the key character input array store to reproduce for scan the information-bearing magnetic conditions respectively established in the two input array stores. Means are provided for recognizing the existence of an information-bearing magnetic condition in the message character input array store, for causing such condition to be reproduced in the scanned store, and for initiating a message character scan of the scanned store by the scanner. A counter is provided which, when activated, is also driven by clock pulses. Means are provided for activating the counter upon recognition by the scanner of magnetic condition in said scanned store indicative of a message character. Means are provided which are effective upon completion of the message character scan by the scanner to cause the character-indicative magnetic condition in the key character input array store to be reproduced in the scanned store and to initiate key character scan of the scanned store by the scanner. An output array, generally comprising twenty-six magnetic cores, is provided. The output array cores are sequentially pulsed by, and in step with, the counter. A gate is coupled to the output core array, and means are provided for activating the gate to cause the output array to read out upon recognition by the scanner of a magnetic condition in the scanned store representative of a key character.. The output array thereby yields a signal representative of the third or triad character of a Vigenère Square determined by the particular message and key character permutation. A converter comprising five bi-stable multivibrators and a distributor is provided to convert the triad character read out signal from the output array to five-unit Baudot code.

Further objects and features of this invention will be apparent from the following detailed description when considered in conjunction with the accompanying drawings wherein.

Since the circuitry is rather extensive, a functional description of the operation of the disclosed embodiment, as a whole, will be set forth by reference to the block diagram of FIG. 2, followed by an operational description of specific circuits shown schematically in FIGS. 3, 4, 5, 6, and 7.

Figure 2:
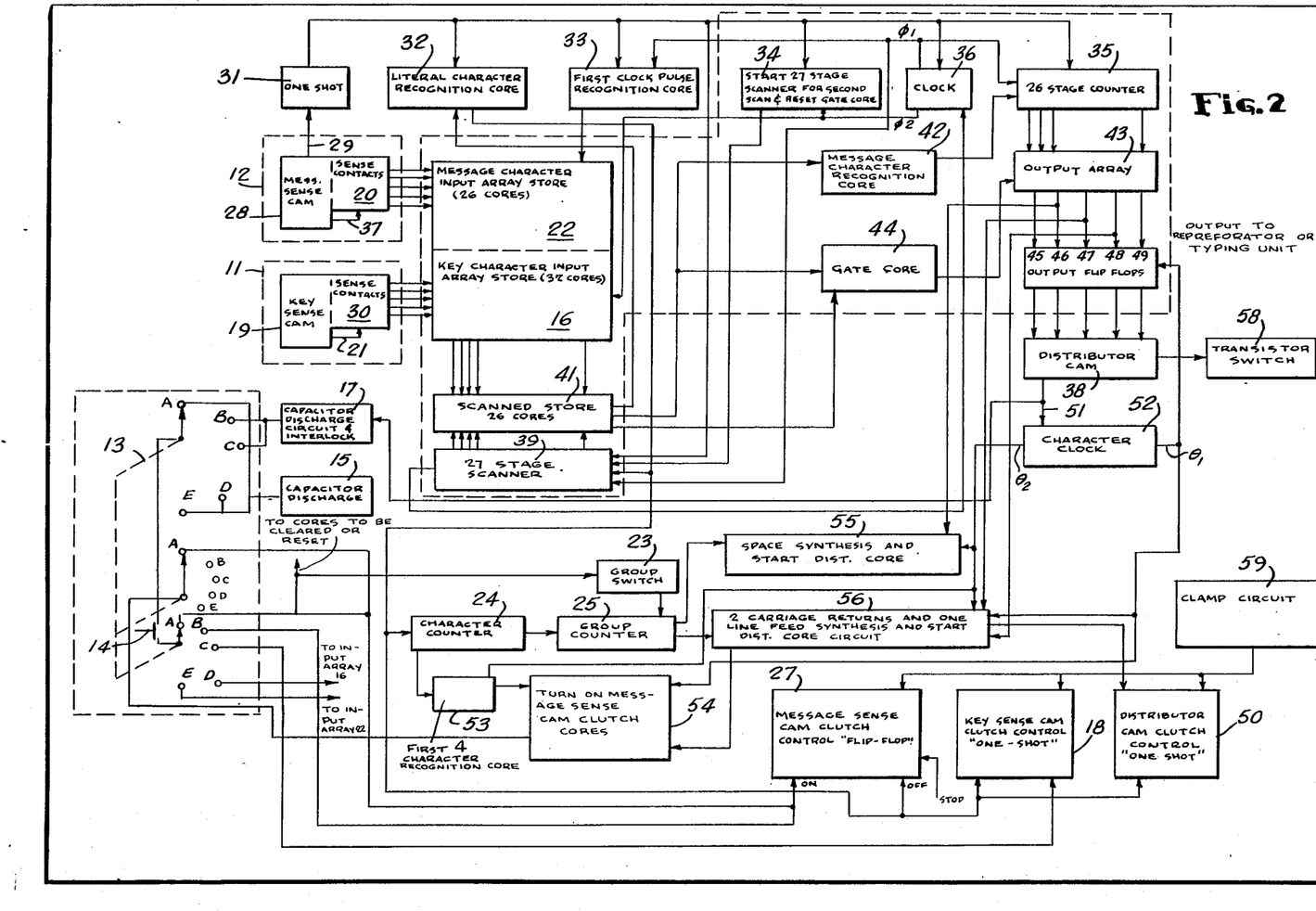
FIG. 2 is a block diagram of a preferred embodiment of the invention.

Referring first to FIG. 2, a block diagram is shown of an embodiment of the present invention arranged for off-line use as an enciphering machine which functions automatically in accordance with the particular Vigenère matrix shown in FIG. 1. The FIG. 2 embodiment utilizes two tape reading or sensing units and one distributor unit, all driven by a common motor. This may be provided by employing a standard Teletype Model 28 transmitter-distributor (TD) modified to include an additional sensing unit in tandem with the existing tape sensing unit. The TD will be described only to the extent necessary to an understanding of the invention. A detailed description of the Model 28 TD may be found in Navy Technical Manual NAV. SHIPS 93534.

The operation of the disclosed embodiment proceeds as follows. A continuous-stream punched key tape is placed in the key tape input 11 (shown diagramatically) with the first information holes one step before the message tape sensing pins (not shown). Ganged function switch 13 is switched to position D and pressure-sensitive start button 14 is temporarily depressed. Depression of start button 14 connects capacitor discharge circuit 15 to the key character input array store 16. Energy released from the capacitor discharge circuit 15 clears the magnetic cores contained in store 16 of any information. Switch 13 is next switched to position C, and start button 14 is depressed twice. This action causes two pulses from capacitor discharge and interlock circuit 17 to be transmitted to key sense cam clutch control "one shot" multivibrator 18 which, in turn, actuates the key character sense cam clutch (not shown). The sense cam 19 (shown diagrammatically) is thereby caused to rotate one complete revolution. During this revolution, a 36 degree auxiliary cam contact 21 is closed causing the first key character to be effectively transferred from sense cam contacts 30 (shown diagrammatically in FIG. 2) into array store 16 in preparation for comparison with the first literal message character. Switch 13 is next switched to position E, and start button 14 is depressed once. This action connects capacitor discharge circuit 15 to the message input array store 22. Energy released from capacitor discharge circuit 15 clears the magnetic cores contained in array store 22 of any information. The punched message tape to be enciphered or deciphered is now placed in message tape input 12 (shown diagrammatically) with the first desired character at any position ahead of the key tape sensing pins (not shown). Switch 13 is then switched to position A, and the group switch 23 is switched to the number of five-character-groups that are desired to be contained in the succeeding lines of the message. Start button 14 is again depressed. This action clears all magnetic cores of information except literal character recognition core 32 and cores in the character counter 24 and the group counter 25. Two cores in each counter 24 and 25 are reset to enable counting to begin. "Reset" in this sense means that the core is placed in such a state that when the next read pulse occurs on this core a usable output will be obtained from the core. "Read" or "read out" will be used to denote that a pulse has been received by a reset core causing it to produce a usable output. Any succeeding read pulse will produce no output until the core is reset again.

Depressing the start button 14 with switch 13 in position A further causes a pulse from capacitor discharge circuit 15 to be delivered to "flip-flop" circuit 27 which, in turn, actuates the message character sense cam clutch (not shown). The sense cam 28 (shown diagrammatically) is thereby caused to rotate one complete revolution. When the 36 degree (this could be any angle prior to the sensing contact transition) auxiliary cam contact 21 closes, it triggers "one shot" multivibrator 31. A pulse from "one shot" 31 resets literal recognition core 32, first clock pulse recognition core 33, and second scan core 34. The pulse also clears the cores in counter 35 of any information and starts clock 36. When the 230 degree auxiliary cam contact 37 is closed, the first message character is sensed by the sense cam contacts 20 and presented to the message character input array store 22. If the character presented is a literal character, it is stored in array store 22. If the character is a nonliteral function character, it is effectively rejected by array store 22. If a literal character is not recognized when the message character input array store 22 is read out by the first clock recognition core 33, the "flip-flop" 27 will not turn off, and the sense cam 28 will continue beyond the 360 degree stop to begin another complete revolution. On the other hand, if a literal character is recognized when array store 22 is read out by core 33, "flip-flop" 27 will be switched, disengaging the sense cam 28 clutch, and the sense cam will come to rest at the 360 degree stop. It should be noted at this juncture that the length of closure of the 230 and 36 degree auxiliary contacts 37 and 21, respectively, should not overlap the sensing contact transition if errors in transition from mark to space or space to mark are to be precluded.

The information applied to the message character input array store 22 by the sense cam contacts 20 causes one out of twenty-six cores in this array to be switched. This assumes a literal character was applied to the array. As previously indicated, no recognition will occur if a nonliteral character was sensed because a core will not be switched and the tape will continue to the next character.

With reference to the time sequence of scanner 39, the twenty-six cores of the message character input array are representative of alphabet characters in standard alphabetic sequence, A through Z. Twenty-six of the thirty-two magnetic cores in the key character input array store 16 are representative of alphabet characters in reverse alphabetic sequence, Z through A. The remaining six cores represent nonliteral function characters, these six cores are paralleled with the letter Q core such that the letter Q is effectively substituted for each nonliteral key character for enciphering and deciphering purposes.

The message tape continues to be stepped by the message sense cam 28 until a literal character is recognized when the first clock pulse recognition core 33 reads out message character input array store 22. Read out of array 22 and character recognition is accomplished as follows. The first clock pulse from clock 36 switches the first clock pulse recognition core 33 which, in turn, causes a pulse to be transmitted to message character input array store 22. This pulse switches the core in array store 22 which was reset to represent a particular literal character when the 230 degree auxiliary contact closed. The switching of this core causes a core in the same relative position in the scanned store 41 to reset. The reset of a core in scanned store 41, in turn, causes the literal character recognition core 32 to be switched. A pulse from this core 32, in turn, starts the twenty-seven-stage scanner 39 which scans storage in synchronism with the clock pulse rate $\phi_1$, steps the character counter 24 one step and turns off the message TD sense cam clutch control "flip-flop" 27. This pulse also triggers on the key TD distributor and sense cam clutch control "one shots" 50 and 18 to allow the key TD sense cam 19 and key TD distributor cam 38 to begin rotation.

On successive clock 36 pulses, the twenty-seven-stage scanner 39 scans the scanned store 41 by sequentially pulsing the twenty-six magnetic cores contained therein. When the particular core reset by read out of the message character input array store 22 is pulsed, it reads and delivers a pulse to the message character recognition core 42. Core 42, in turn, sets up twenty-six-stage counter 35 to begin counting and pulsing the output array 43 on successive clock 36 pulses. The same clock 36 pulses are now driving the twenty-seven-stage scanner 39 and the twenty-six-stage counter 35. The twenty-seven-stage scanner 39 continues to step along with the twenty-six-stage counter until the twenty-seventh stage is reached. When the twenty-seventh stage of scanner 39 is reached, a pulse is delivered to clock 36. The clock 36 is arranged to respond to this pulse by providing a "second phase" pulse $\phi_2$ between the normal "phase one" clock 36 pulses $\phi_1$. The twenty-seventh $\phi_1$ clock 36 pulse allows the twenty-six-stage counter 35 to get back in step with the twenty-seven-stage scanner 39. The counter was one step behind since the output from the scanned store 41 set up the counter 35 to start counting, and the actual count did not start until one $\phi_1$ clock 36 pulse later. The "phase two" pulse $\phi_2$ from the clock 36 switches the core that was reset in the key character input array store 16. Switching of this core resets the core in the same relative position in the scanned store 41. The $\phi_2$ clock 36 pulse also reads second scan core 34 which, in turn, initiates a key character scan by the twenty-seven-stage scanner 39 and resets the gate core 44. The scanner 39, thus, begins scan of the scanned store 41 for the second time, and the counter 35 continues to count pulse-for-pulse with scanner 39. The core which was reset in the scanned store 41 by the key character input array store 16 is eventually read by a pulse from scanner 39. The output pulse from this core is applied to gate core 44 which, in turn, reads the particular cores in the output array 43 being pulsed by the counter 35 at that time. The output from array 43 represents the Vigenère triad character resulting from the combination of the instant message character and the instant key character. The output from the particular output array 43 cores that were switched trigger the corresponding "flip-flops" of the group of five output flip-flops 45, 46, 47, 48, and 49. The distributor (not shown in FIG. 2) scans these flip-flops to translate the character formed on the output flip-flops to serial five-unit Baudot code.

The combining operations just described—from the triggering of "one-shot" multivibrator 31 to appearance of the triad character on the output flip-flops—are completed during the period of time the distributor cam 38 takes to come from a stop position to the number one baud position. The "one shot" multivibrator 31 remains on for this period of time. The operation is also completed prior to closure of the 230 degree auxiliary cam contact 21 which places the next key character into input array store 16.

Upon completion of one revolution, the distributor cam 38 closes stop contact 51 to cause character clock 52 to form two sequential pulses designated $\theta_1$ and $\theta_2$. The first pulse $\theta_1$ clears the five output flip-flops. If the triad character just formed was one of the first four characters of a five character group, as determined by character counter 24 and first four character recognition core 53, one of the message sense cam clutch cores 54 will be read by the $\theta_1$ pulse, causing the message sense cam clutch control "flip-flop" 27 to turn on. This occurs if switch 13 is in the normal A position. If the switch 13 is in the character-at-a-time B position, the start button 14 must be depressed to turn on "flip-flop" 27.

If the fifth character in a group had just been formed, as determined by character counter 24 and by group counter 25, space synthesis core 55 is switched by the second character clock pulse $\theta_2$. The space synthesis core 55 causes a "space" character to be formed in the output flip-flops and turns on the distributor cam clutch control "one shot" 50. The distributor scans the output "flip-flops" to translate the "space" character to five-unit Baudot code. After the "space" character is thus formed, the next $\theta_1$ pulse reads one of the message sense cam clutch cores 54 which turns on the message sense cam clutch control "flip-flop" 27 to continue the tape sensing and combining operation.

After the completion of ten groups (assuming group switch 23 is set at the ten group position) of five characters, group counter 25 activates core circuit 56 which synthesizes a "carriage return" character in the output flip-flops and turns on the distributor cam clutch control "one shot" 50. The distributor scans the output "flip-flops" to translate the "carriage return" character into five-unit Baudot code. This cycle is repeated, until two "carriage return" and one "line feed" characters have been formed. At the end of this time, a $\theta_1$ character clock pulse reads one of the cores 54 to turn on the message sense cam clutch control "flip-flop" 27 to continue the tape sensing and combining operation.

Figure 3:
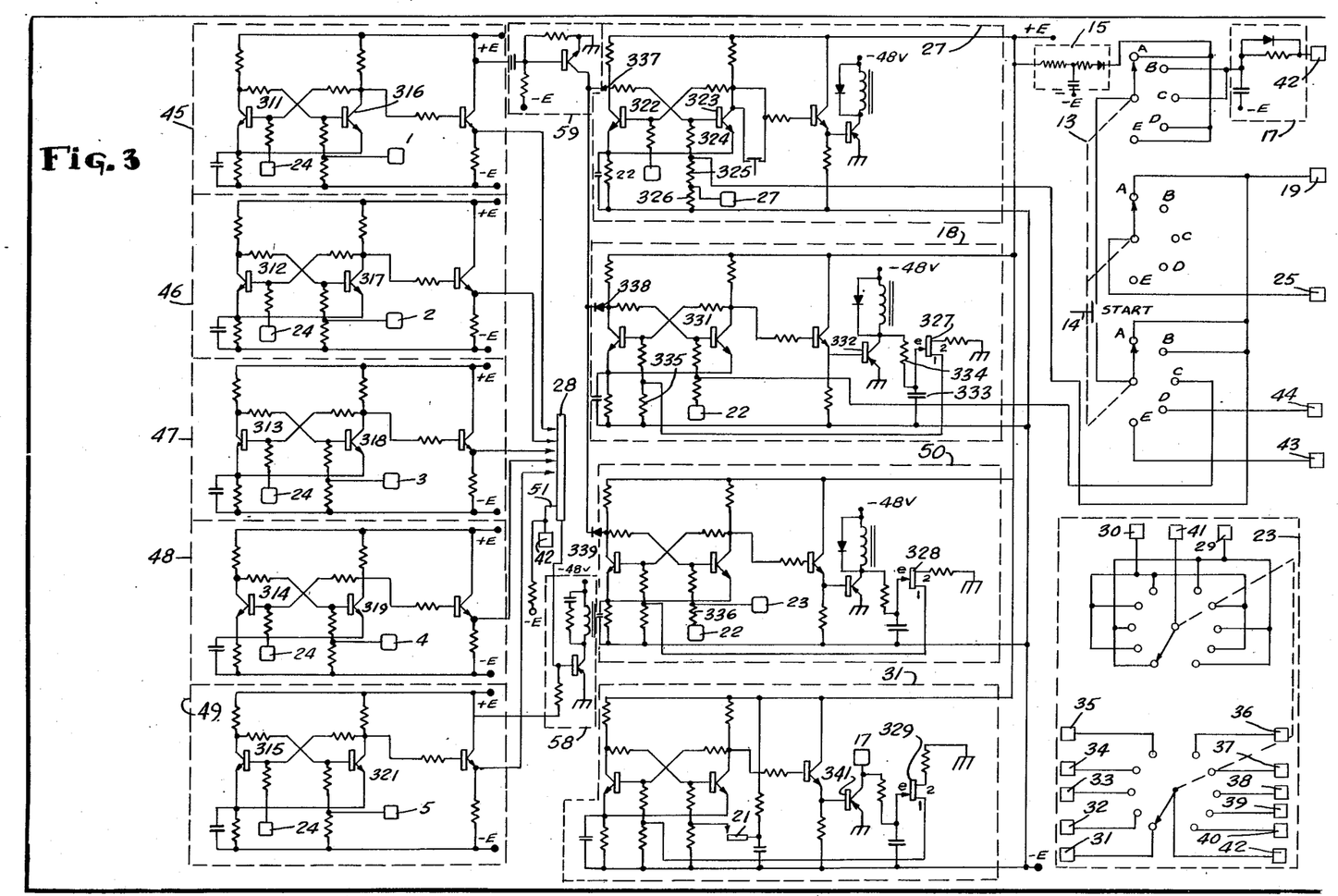
FIGS. 3, 4, 5, 6, and 7 constitute a schematic diagram of the preferred embodiment of FIG. 2.
Figure 7:
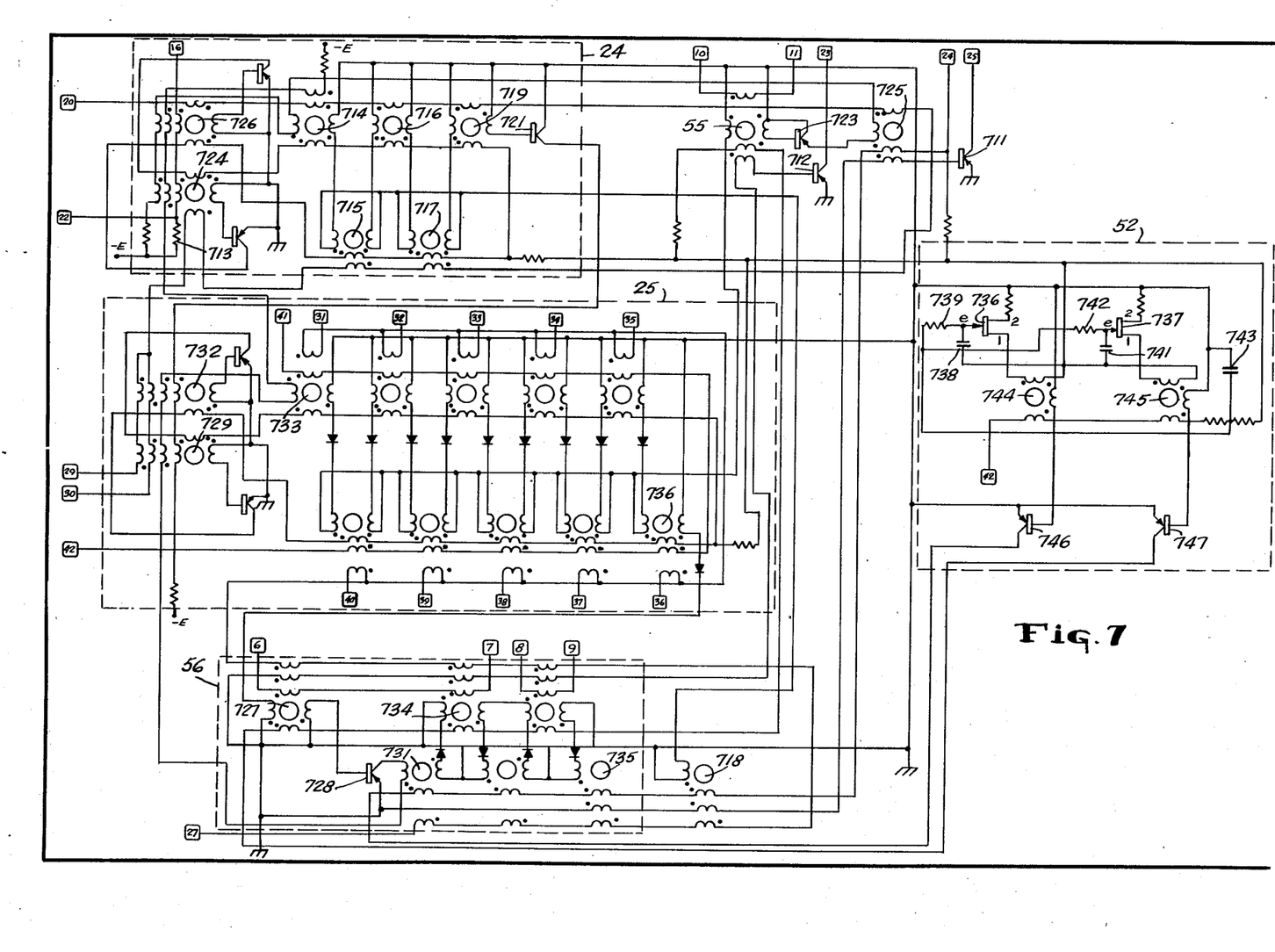

FIG. 3. FIG. 3 is a schematic diagram of the output "flip-flops" 45, 46, 47, 48, and 49; the message cam clutch control "flip-flop" 27; the key sense cam clutch control "one shot" 18; the distributor cam clutch control "one shot" 50; and "one shot" multivibrator 31. Also shown are the distributor cam 28, transistor switch 58, function switch 13, capacitor discharge circuit 15, capacitor discharge and interlock circuit 17, ganged ten-position group switch 23 and clamp circuit 59. The "flip-flop" circuits 45, 46, 47, 48, 49, and 27 are standard in design, comprising generally a transistorized Eccles-Jordan bistable multivibrator circuit isolated from its load by an emitter follower. The output "flip-flops" 45, 46, 47, 48, and 49 are cleared by a positive pulse occurring at terminal 24 which renders transistors 311, 312, 313, 314, and 315 conductive and transistors 316, 317, 318, 319, and 321 nonconductive. This occurs when a $\theta_1$ pulse, generated by the character clock 52, appears at terminal 24. The utilization of a single pulse simultaneously to clear the five "flip-flop" circuits is made possible by the low source resistance of the pulse. "Flip-flops" 45, 46, 47, 48, and 49 are respectively triggered when a pulse appears from the output array 43 at terminals 1, 2, 3, 4, and 5. Message sense cam clutch control "flip-flop" 27 is cleared or turned off by the appearance of a positive pulse terminal 27 which renders transistor 322 conductive and transistor 323 nonconductive. A positive pulse appears at terminal 27 whenever the literal recognition core 32 is read out. "Flip-flop" 27 is triggered, or turned on, by the occurrence of a positive voltage drop across the resistor divider comprising resistors 324, 325, and 326 in series with the transistor 323 base return lead. The positive voltage drop will be produced by the appearance, via switch 13, of a positive pulse resulting when transistor 711, FIG. 7, is caused to conduct. A positive voltage drop is also produced by the appearance of a positive pulse at terminal 27 when the start button 14 is depressed with function switch 13 in the A position.

"One shots" 18, 31, and 50 also comprise, in part, a transistorized Eccles-Jordan circuit isolated by an emitter follower. Monostable operation is achieved by time-delayed "turn off" pulses generated by unijunction transistors 327, 328, and 329. The operation of "one shot" 18, for example, is as follows. With transistor 331 in the "off", or nonconductive state, load transistor 332 is cut off and the emitter function is reverse biased. Characteristically, the unijunction transistor 327 will not conduct until a positive voltage appears on the emitter of sufficient amplitude to forward bias the emitter junction, at which point the transistor will "fire". A more detailed description of the structure and operating characteristics of unijunction transistors appears at pages 336–341 of *Transistors* by Milton S. Kives (McGraw-Hill, 3rd edition 1962). When a trigger pulse, such as that appearing at terminal 22, causes transistor 332 to conduct, capacitor 333 begins to charge positive with respect to base 1 of transistor 327. After a period of time determined by the RC time constant of resistor 334 and capacitor 333, the charge on capacitor 333 reaches a sufficient voltage level to forward bias the emitter junction of transistor 327 causing it to "fire", and capacitor 333 begins to discharge through the emitter-base 1 path of transistor 327, causing a voltage drop across resistor 335 which causes "one shot" 18 to turn off. During the period of time from trigger to off, during which transistor 332 is conducting, the message sense cam clutch is operative to cause the message sense cam to rotate. The operation of distributor cam clutch control "one shot" 50 is similar.

The appearance of a positive pulse at terminal 27 clears the message sense cam clutch control "flip-flop" 27 and simultaneously triggers the key sense and distributor cam clutch control "one shots" 18 and 50. This pulse appears when transistor 511, FIG. 5, a low output resistance pulse source, is caused to conduct by the reset of literal character recognition core 32. The distributor cam clutch control "one-shot" 50 is also triggered by the appearance of a positive pulse at terminal 23 which occurs when 712, FIG. 7, is caused to conduct by the reset of space synthesis core 55. Isolation between terminal 23 and terminal 22 is provided by making resistor 336 large in comparison with resistor 713, FIG. 7.

Clamp circuit 59 generates a negative pulse when the power E+ is turned on, which is applied through diodes 337, 338, and 339 respectively to clear the message sense cam clutch control "flip-flop" 27, key sense cam clutch control "one-shot" 18, and distributor cam clutch control "one-shot" 50.

The following numbered squares appearing on FIG. 3 connect to correspondingly numbered squares on the other Figures as follows: 43 and 44 on FIG. 4; 19 on FIG. 5; 25, 29–42 on FIG. 7.

Figure 4:
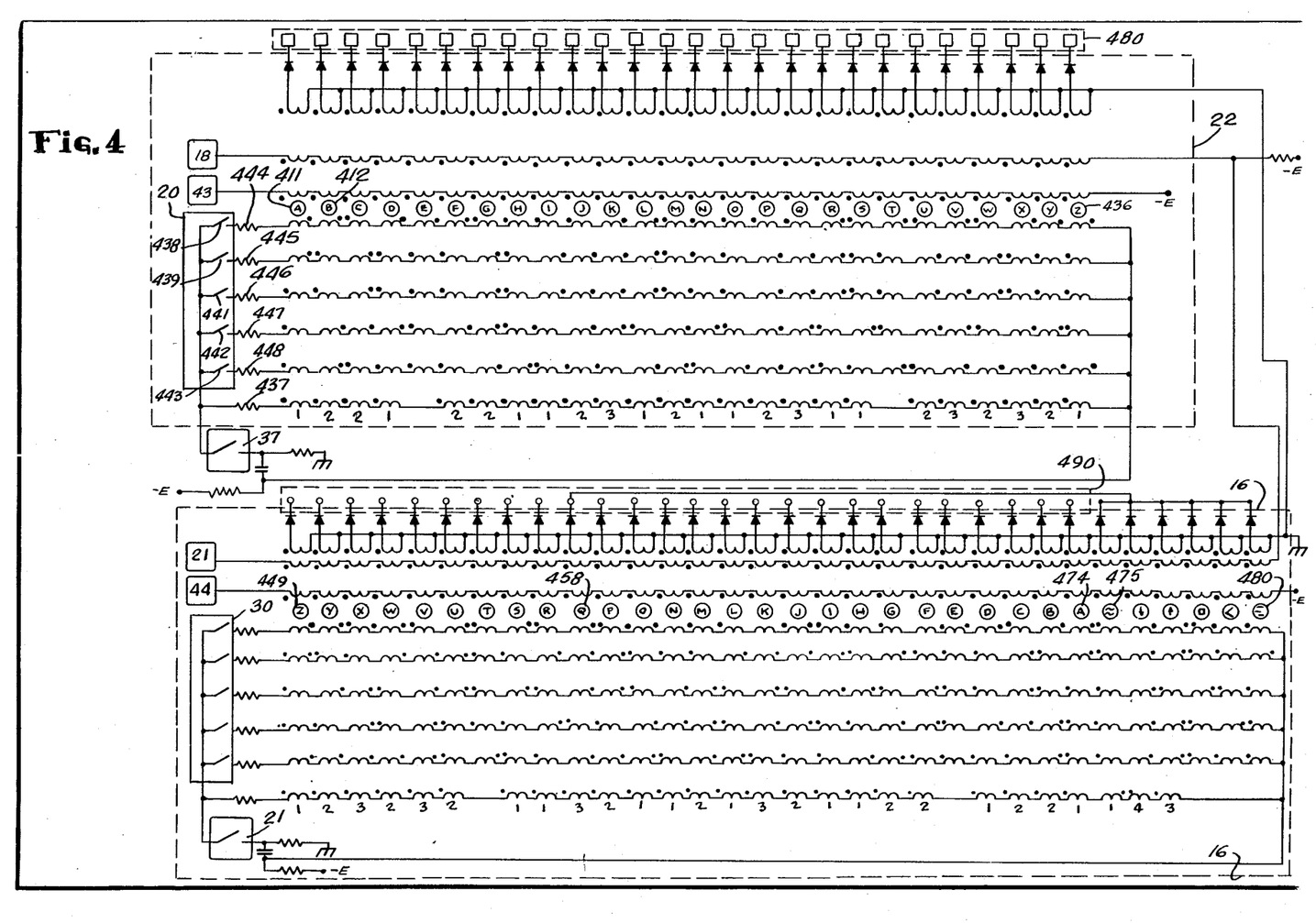

FIG. 4. Referring next to FIG. 4, there are shown schematic diagrams of the message character input array store 22, the key character input array store 16, sense cam contacts 20 and 30, and 230 degree and 36 degree auxiliary cam contacts 37 and 21, respectively. The message character input array store 22 comprises a plurality of twenty-six magnetic cores 411 through 436. As previously indicated, the twenty-six cores 411 through 436 represent literal character A through Z in normal alphabetic sequence with reference to the time sequence of scanner 39. Each core is provided with nine distinct windings. The standard dot convention is utilized to indicate polarity. The magnetic cores are conventional in structure and operating characteristics, as described in the technical literature such as *Digital Computer Components and Circuits* by R. K. Richards (Van Nostrand 1958), chapters 5 and 8. All windings comprise one turn except the row of windings in series with resistor 437. The number of turns on each of the windings in this row are shown in FIG. 4 and are the number of such windings required to produce a net positive MMF in only the core indicative of the literal character being sensed. This core is thus caused to reset. The message sense cam contacts 20 comprise five contact switches 438, 439, 441, 442, and 443 in series respectively with resistors 444, 445, 446, 447 and 448 and their associated rows of windings. Resistors 444 through 448 are equal in resistance value. The five contact switches are individually open or closed in accordance with the arrangement of tape perforations indicative of the particular message character being sensed. Upon closure of 230 degree auxiliary cam contact 37, the particular core indicative of the literal character sensed will be reset. The other cores in the input array store 22 will experience a net zero or negative MMF and will not reset. Since no core is arranged to reset when a nonliteral function character is presented, such characters are effectively rejected by input array store 22.

When the start button 14 is depressed with function switch 13 in the E position, a positive pulse from capacitor discharge circuit 15 appears at terminal 43 which clears the cores in input array store 22. A positive pulse appears at terminal 18 to cause the particular core reset by the closure of the 230 degree auxiliary cam contact 37 to read when the first clock pulse recognition core 33 is read causing transistor 512, FIG. 5, to conduct. Read out of a core in input array 22, causes the magnetic core in the same relative position in scanned store 41 to reset.

The general structure and operation of key character input array store 16 is similar to that of message character input array store 22. In input array store 16 there are thirty-two cores. Cores 449 through 474 are indicative of literal characters Z through A, respectively, in reverse alphabetic sequence with reference to the time sequence of scanner 39. Cores 475 through 480 are indicative of six nonliteral function characters. Input array store 22 is initially cleared for operation by a pulse from capacitor discharge circuit 15 when start button 14 is depressed with function switch 13 in the D position. Upon closure of 230 degree auxiliary cam contact 21, the particular core representative of the literal or nonliteral character sensed by the sense contacts 30 is reset. This core is read out by the appearance of clock 36 pulse $\phi_2$ at terminal 21 and the core in the same relative position in the scanned store 41 is reset if the core read out is one of the group 449 through 474. If the core read out is one of the group 475 through 480, indicative of a nonliteral function character, the core in the scanned store corresponding to 458 in input array store 16, the letter Q, is thus effectively substituted for the six nonliteral function characters.

The following numbered terminals appearing on FIG. 4 connect to correspondingly numbered terminals on the other Figures as follows: 43 and 44 on FIG. 3; 18, 21, 480 and 490 on FIG. 5.

Figure 5:
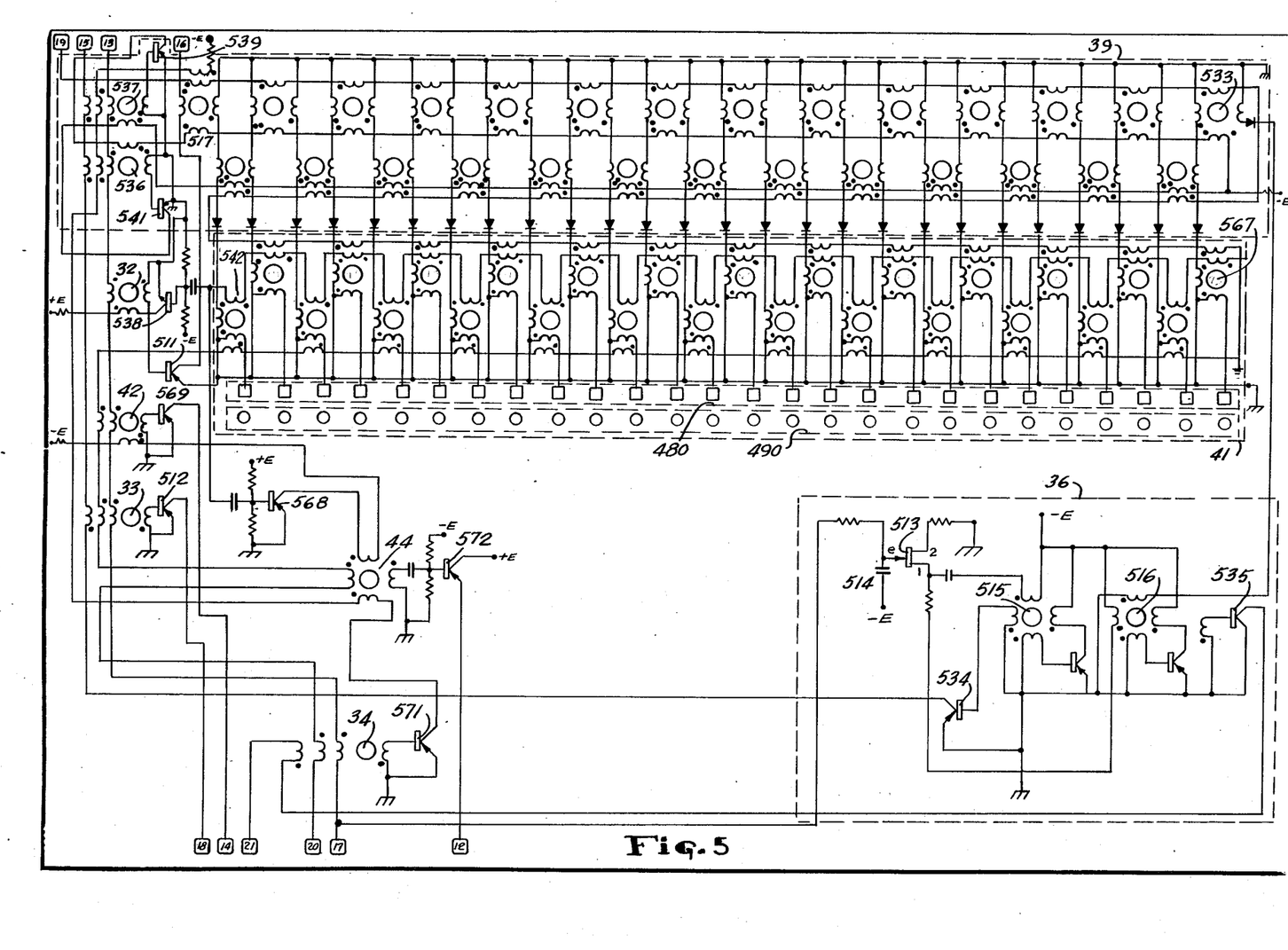

FIG. 5. Referring now to FIG. 5, there are shown schematic diagrams of the clock 36, scanned store 41, scanner 39, and five control cores 32, 33, 34, 42, and 44. Clock 36 comprises a regenerative oscillator circuit driving two pulse forming magnetic core circuits. The oscillator circuit is a conventional unijunction transistor oscillator circuit. Unijunction transistor 513 alternately "fires" when capacitor 514 charges bringing the emitter of transistor 1 513 to a sufficiently positive voltage to forward bias the emitter junction and cuts off when capacitor 514 discharges through the emitter junction. This oscillatory action is initiated whenever "one-shot" circuit 31 is triggered so that transistor 341, FIG. 3, conducts. When transistor 341 is nonconductive, capacitor 514 is prevented from charging, thus preventing oscillatory action in clock 36.

Unijunction transistor 513 serves as the source of both read and reset pulses for core 515 and as the source for read pulses for core 516. The reset for core 516 is provided by core 533, the last stage of scanner 39. Thus normal $\phi$ clock pulses are produced by transistor 534 when core 515 is periodically read by pulses from transistor 513. A $\phi_2$ clock pulse is produced by transistor 535 when the scanner 39 reaches stage 27 causing core 533 to read, which in turn reads core 516.

When the 36 degree auxiliary cam contact 21 is closed causing "one-shot" to trigger and transistor 341 to conduct, terminal 17 approaches ground potential. As just indicated, this initiates oscillatory action in clock 36. In addition, it causes cores 32, 33, 34, 42 and 536 to reset and core 537 to read if it is in a reset condition. When the first $\phi_1$ clock pulse subsequently occurs, cores 33 and 536 are read and core 537 is reset. When core 33 is read out, transistor 512 emits a pulse at terminal 18 which is applied to the message character input array store 22. If a core in array store 22 is in a reset condition, indicative of a particular literal character, a core in the same relative position in the scanned store 41 will be reset. Reset of a core in scanned store 41 causes transistor 538 to conduct which, in turn, reads core 32. When core 32 is read, transistor 54 conducts causing core 517 to reset and providing a pulse to the character counter at terminal 16.

Scanner 39 is a twenty-seven-stage magnetic-core shift register. As successive $\phi_1$ clock pulses alternately read cores 537 and 536 transistors 539 and 541 respectively provide shift line pulses alternately to the odd and even numbered cores, thereby advancing the scanner sequentially through its 27 stages. As the cores 517 and 533 read sequentially, the twenty-six cores 542 through 567 on the scanned store 41 are pulsed sequentially. When the selected core in scanned store 41 which was reset by the message input array store 22 is pulsed by the scanner 39, transistor 568 conducts causing core 42 to read. When 42 is read, transistor 569 conducts causing a pulse to be delivered to terminal 14 which causes the counter 35 to begin counting. As previously mentioned, when core 533 in scanner 39 reads, it resets core 516 in clock 36. Core 516 is then read by the next pulse from unijunction transistor 513 and a "phase two" pulse $\phi_2$ is emitted by transistor 535. The $\phi_2$ pulse causes core 34 and the reset core in the key character input array store 16 to read. Read out of the selected input array 16 core causes the corresponding core in the scanned store 41 to reset. Read out of core 34 causes transistor 571 to conduct providing a pulse which resets cores 44, 537 and 517 and reads core 536. Thus, the scanner 39 begins second scan of scanned store 41. When the reset scanned store 41 core is read, transistor 568 again conducts causing core 44 to read and transistor 572 to conduct. Thus, a pulse is delivered via terminal 12 to diode 611, FIG. 6, which is thereby reverse biased causing the output array 43 cores being pulsed by the counter 35 at that time to read to form the triad character in the output "flip-flop" circuit. A $\phi_2$ clock 36 pulse will occur when core 533 read at the end of second scan but since none of the cores pulsed by $\phi_2$ are in a reset condition at this time, it initiates no action.

The following numbered terminals appearing on FIG. 5 connect to correspondingly numbered terminals on the other Figures as follows: 17 and 19 on FIG. 3; 18 and 21 on FIG. 4; 12, 13, 14 and 15 on FIG. 6; 16 and 20 on FIG. 7.

Figure 6:
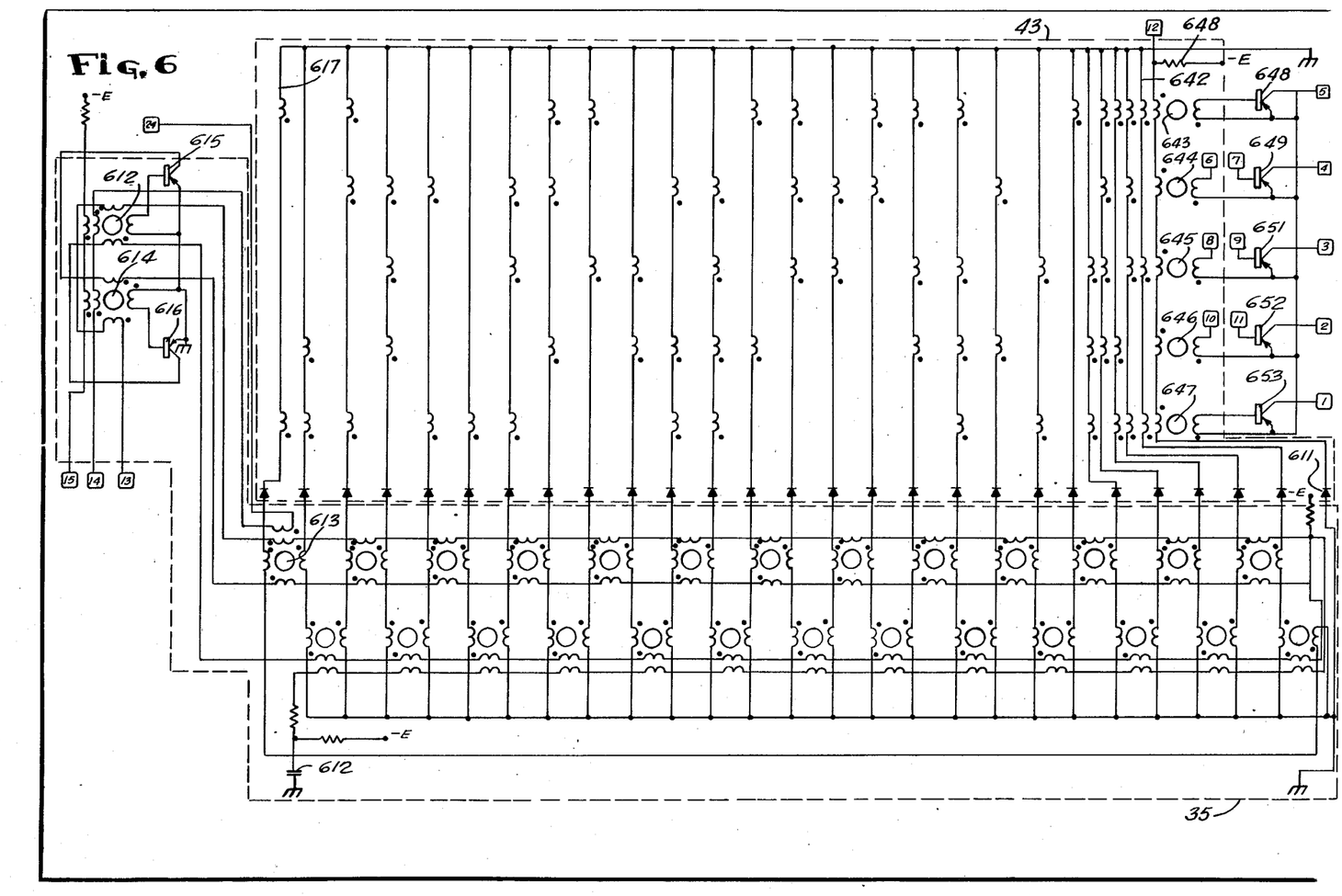

FIG. 6. Referring next to FIG. 6, there are shown schematic diagrams of the twenty-six stage counter 35 and the output array 43. Counter 35 is a shift register similar in structure and *modus operandi* to the scanner 39. Capacitor 612 provides the energy to clear the counter 35 and cores 537, 536, 32, 42, 33, and 34, FIG. 4, when "one-shot" circuit 31 is triggered on. When the core in the scanned store 41, which was reset by the message character input array 22 is read, a pulse from 569, FIG. 4, is applied via terminal 14 to cores 612 and 613 which resets those cores. The counter 35 then proceeds to count as successive $\phi_1$ clock 36 pulses appear at terminal 15 to alternately read cores 612 and 614 causing transistors 615 and 616 respectively to provide shiftline pulses alternately to the odd and even numbered cores. Thus, the counter 35 is advanced sequentially through its 26 stage count by the $\phi_1$ clock 36 pulses. The same clock pulses at this time are driving both the scanner 39 and the counter 35. As the counter 35 proceeds with its count, the output pulses from the cores read out count are sequentially applied to the associated information lines 617 through 642 wound on the five output cores 643, 644, 645, 646, and 647. The output cores are prevented from reading by the current flowing through resistor 648 from $-E$ through diode 611 to ground, the MMF on the output cores from this current is large enough so that reverse MMF applied by counter 35 to each of the information lines 617 through 642 is insufficient to urge the core beyond the coercive magnetization point. As a result no output voltage appears on the bases of transistors 648, 649, 651, 652, and 653 from the output cores so long as diode 611 conducts. The only time diode 611 is rendered nonconductive is when transistor 572, FIG. 5, conducts. This results in the application of a reverse bias to diode 611 to remove the reverse magnetization current for a brief interval of time. The particular information line being pulsed at this point in time cause the selected output cores to read and their associated output transistors to conduct. The triad character is thus formed in the ouput "flip-flop" circuits.

The following numbered terminals appearing in FIG. 6 connect to correspondingly numbered terminals on the other Figures as follows: 1–5 on FIG. 3; 6–11 on FIG. 7; 12–15 on FIG. 5; 24 on FIGS. 3 and 7.

FIG. 7. FIG. 7 is a schematic diagram of the character counter 24, group counter 25, character clock 52, and various control cores and character syntheses cores. Some of these cores serve a dual purpose such as synthesizing a space character and triggering the distributor sense cam clutch control "flip-flop" 50 simultaneously. The character counter 24 and the group counter 25 are shift registers with *modus operandi* similar to the counter 35 and scanner 39 previously described. The read of any of the first four cores 714, 715, 716, and 717 in character counter 24 will cause core 718 to reset. When the key distributor stop contact 51 closes, a character clock $\theta_1$ read pulse is applied to core 718. Read of core 718, in turn, causes transistor 711 to conduct and to deliver a trigger pulse to message sense cam clutch control "flip-flop" 27 via terminal 25. This mode of operation continues until the occurrence of the fifth character of a character group is marked in character counter 24 by the read out of core 719. Read out of core 719 causes 721 to conduct and deliver a pulse to the group counter 25. Core 55 resets upon read out of a core in the group counter 25. Core 55, in turn, reads out when a $\theta_2$ pulse from the character clock 52 is applied to it. Read out of core 55 causes a trigger pulse to be delivered to ouput "flip-flop" 46 thereby synthesizing a "space" character in the output "flip-flops". At the same time 712 is caused to conduct and deliver a trigger pulse to the key distributor cam clutch control "one-shot" 50 via terminal 23. In addition, 723 is caused to conduct and emit a pulse which reads core 724 and resets cores 725, 726, and 714. Closure of the key distributor stop contact causes a character clock 52 $\theta_1$ pulse to read core 725 which, in turn, causes transistor 711 to conduct to trigger on the message sense cam clutch control "flip-flop" 27.

The formation of groups as described continues until core 726 in the group counter 25 reads out and resets core 727. When a $\theta_2$ pulse from character clock 52 reads core 727, output "flip-flop" 48 is triggered on to synthesize a "carriage return" character, the distributor cam clutch control "one-shot" 31 is triggered on and transistor 728 conducts. The pulse emitted by transistor 728 reads cores 729 and 724 and resets cores 731, 732, 733, 726, and 714. This action sets up the group and character counter to begin new counts. Upon closure of the key distributor stop contact, a $\theta_1$ pulse is generated by character clock 52 a few milliseconds later. Read out of core 734 causes a second "carriage return" character to be synthesized in the output "flip-flops". This mode of operation continues causing a "line feed" character next to be synthesized in the output "flip-flops" and ending when core 735 is reset. Read out of 735 by a $\theta_1$ pulse from character clock 52 results in transistor 711 becoming conductive and triggering on the message sense cam clutch control "flip-flop" 27.

The cores in the group counter 25 are wound in a manner as to provide a means in conjunction with group switch 23, FIG. 3, for resetting the proper cores such that any number of character groups from one to ten may be selected as the interval between the "carriage return" and "line feed" character synthesis sequence. The number of turns in each winding of the cores in the group counter are shown in FIG. 7, if greater than one. Setting switch 23 to the desired position enables reset of the proper drive core 732 or 729, depending on whether an odd or even count is required, and a net reset MMF to the selected counting core.

The two unijunction transistors 736 and 737 provide the two time intervals for this clock. The RC time delay of capacitor 738 and resistor 739 is made smaller than that of capacitor 741 and resistor 742 by making capacitors 738 and 741 of equal capacitance and resistor 739 of lower resistance than 742. When the distributor stop contact 51 is open during the distributor scanning interval, the emitters of transistors 736 and 737 are maintained at $-E$ volts by the charge on capacitor 743. This prevents capacitors 738 and 741 from charging and 736 and 737 remain nonconductive. When the distributor stop contact 51 closes, 743 discharges through the switch transistor circuit 58, FIG. 3, and cores 744 and 745 are reset. Capacitor 738 charges to the trigger voltage level first, causing transistor 736 to "fire" before transistor 737. When transistor 736 "fires" core 744 is read out causing transistor 746 to emit a $\theta_1$ pulse. Successive pulses to core 744 is read out causing transistor 746 to emit a $\theta_1$ pulse. Successive pulses to core 744 from transistor 736 will not read core 744 until core 744 is again reset by closure of the distributor cam stop contact 51. In like manner, the $\theta_2$ pulse is produced by transistor 747 a few milliseconds later.

The following numbered terminals appearing in FIG. 7 connect to correspondingly numbered terminals on the other Figures as follows: 6–11 on FIG. 6; 16, 20 on FIG. 5; 22, 23, 25, 27, 29–42 on FIG. 3; 24 on FIGS. 3 and 6.

I claim:

1. A cryptographic apparatus comprising:
   a. means for sensing a message character input;
   b. a message character input array store responsive to the message character input sensing means;
   c. means for sensing a key character input;
   d. a key character input array store responsive to the key character input sensing means;
   e. a scanned store array selectively responsive to each element of first the message character input array and then of the key character input array;
   f. a stage scanner sequentially scanning at a pulse repetition rate the scanned store array and producing recognition pulses upon discovery by said stage scanner of a setting of an element of the scanned store array representative of either a message character input or a key character input;
   g. a stage counter activated by a recognition pulse from said stage scanner, said recognition pulse being generated by said stage scanner upon recognition of a message character in said scanned store array;
   h. an output array sequentially pulsed by said stage counter;
   i. a clock regulative of the pulse repetition rate of scanning the scanned store array and of pulsing the output array; and
   j. a gate responsive to a coincidence of a message character recognition pulse and a key character recognition pulse resulting in the transmission of the contents of said output array.

2. The apparatus of claim 1 wherein the key character input array store contains cores responsive to both literal and nonliteral key characters, said cores responsive to nonliteral key characters being connected in parallel to one literal character responsive core thereby causing said literal character core to respond upon sensing of a nonliteral character.

3. The apparatus of claim 2 having means to sense the number of output characters and means for producing a signal representative of a space when a predetermined number of output characters has been sensed, thereby producing groups of output character signals separated by a space signal.

4. The apparatus of claim 3 having means for sensing the number of groups and means for producing signals representative of carriage return and line feed when a predetermined number of groups has been sensed.

* * * * *